Figure 1:
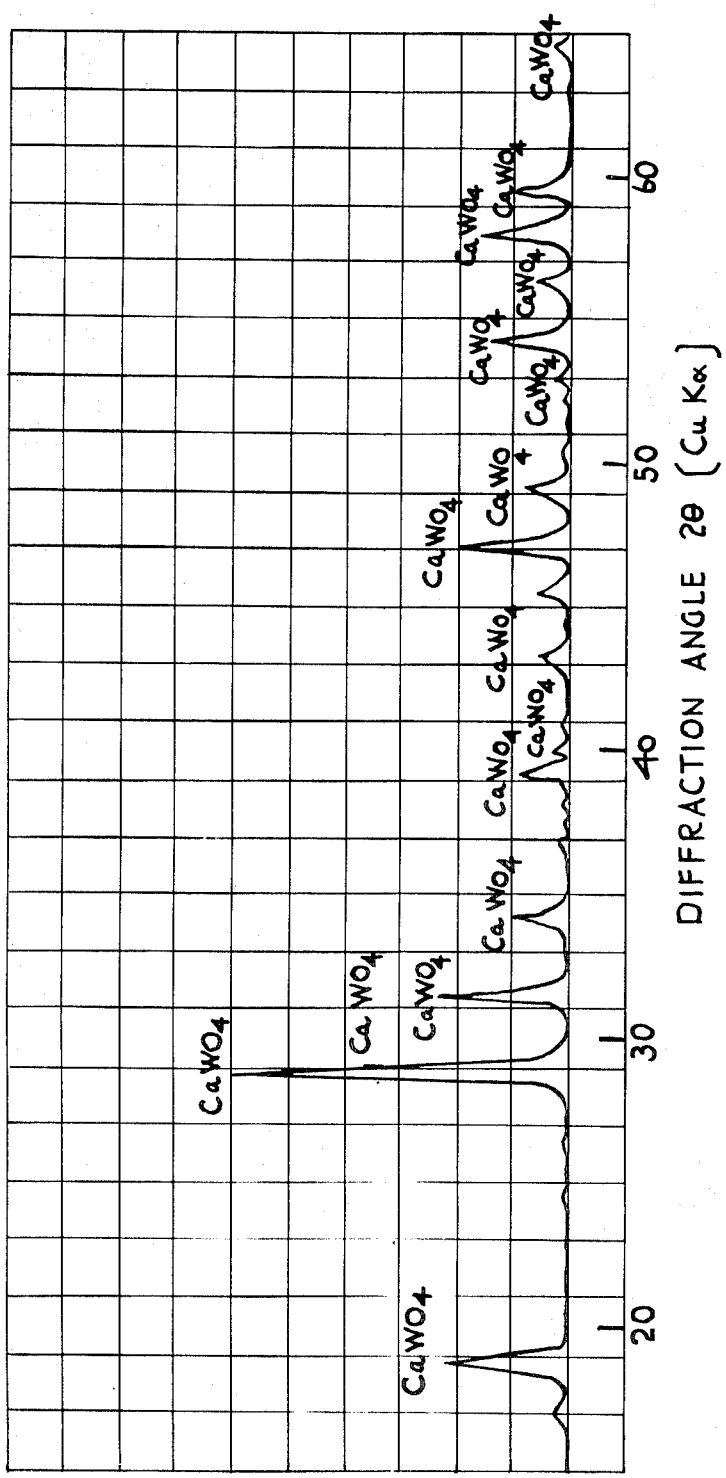

United States Patent

[11] 3,607,320

| [72] | Inventor | Sumio Sakka<br>Troy, N.Y. |
|---|---|---|
| [21] | Appl. No. | 717,527 |
| [22] | Filed | Apr. 1, 1968 |
| [45] | Patented | Sept. 21, 1971 |
| [73] | Assignee | Pittsburgh Plate Glass Company<br>Pittsburgh, Pa. |

[54] PHOTOTROPIC GLASS-CERAMIC ARTICLES CONTAINING BISMUTH DOPED CALCIUM TUNGSTATE CRYSTALS
5 Claims, 3 Drawing Figs.

[52] U.S. Cl. ........................ 106/39 DV,
106/47, 106/52, 106/53, 106/54, 65/33
[51] Int. Cl. ........................ C03c 3/22,
C03c 3/26, C03c 3/14
[50] Field of Search .......................... 106/39 OV, 52; 252/301.5

[56] References Cited
UNITED STATES PATENTS

| 2,049,765 | 8/1936 | Fischer | 106/39 |
|---|---|---|---|
| 2,257,699 | 9/1941 | McKeag et al. | 252/301.5 |
| 2,663,658 | 12/1953 | Schurecht | 106/39 |
| 3,293,052 | 12/1966 | Sawchuk et al. | 106/54 |
| 3,300,670 | 1/1967 | Veres | 106/52 |

OTHER REFERENCES

Weyl- Coloured Glasses, London-Dawson's of Pall Mall (1959) pages 453, 508–510

Kroger- Luminescence of Solids, Elsevier Pub. Co. Inc., N.Y. 1948, pages 136–138, 264, 286

Jakka- J. Am. Cer. Soc., Feb. 1969, pp. 69–73, " Phototropy of Alkaline Earth Tungstates Doped with Bismuth"

*Primary Examiner*—Helen M. McCarthy
*Attorney*—Chisholm and Spencer

ABSTRACT: The instant invention relates to new glass-ceramic articles containing alkaline earth tungstate crystals. More particularly, the invention pertains to a phototropic article comprising a glassy matrix containing an alkaline earth tungstate doped with bismuth. The invention especially pertains to glassy matrices of boric oxide or silica.

PHOTOTROPIC GLASS-CERAMIC ARTICLES CONTAINING BISMUTH DOPED CALCIUM TUNGSTATE CRYSTALS

INVENTION

It has now been discovered that novel glass-ceramic articles can be formed from traditional glass-forming materials and an alkaline earth tungstate. It has further been discovered that novel phototropic articles result when the alkaline earth tungstate is chemically combined with bismuth. In applicant's copending application, Ser. No. 717,868, filed Apr. 1, 1968, compositions of alkaline earth tungstates and bismuth are described.

It has been further discovered that silicate and borate glasses are especially effective in forming glass-ceramic articles comprising a glassy matrix and a crystalline material of an alkaline earth tungstate such as calcium tungstate, barium tungstate, strontium tungstate, and the like. In practicing the instant invention, usual glass-forming raw materials may be utilized along with an alkaline earth tungstate which may have been reacted with bismuth. Alternatively, an alkaline earth compound, a tungsten compound, and a bismuth compound if a phototropic article is desired, may be utilized as part of the glassmaking materials; relying upon the processing conditions necessary to form a glass article to bring about chemical combination of bismuth and alkaline earth tungstate.

The quantity of bismuth necessary to bring about a phototropic effect is a minor quantity, for example, from about 0.01 to about 5 mole percent of the alkaline earth tungstate present. Lesser and greater quantities of bismuth may be utilized although it is preferred that the bismuth be present as about 0.05 to about 2 mole percent of the alkaline earth tungstate, and especially good results have been obtained when the bismuth content was from about 0.1 to about 1.0 mole percent.

The above figures on bismuth concentration relate to bismuth content of the alkaline earth tungstate. If bismuth is not prereacted with the tungstate but is included in the glass batch, then a greater concentration of bismuth must be present because the bismuth will be proportionately distributed between the glassy matrix and the crystalline alkaline earth tungstate.

The quantity of alkaline earth tungstate present in the glass-ceramic articles in this invention may vary widely from the least amount effective to provide a phototropic effect or to provide improved strength, to very large quantities. It has been found generally that a phototropic effect is difficult to obtain when the alkaline earth tungstate is present as less than about 10 percent by weight of the glass-ceramic article. The crystal content may be as high as 90 percent by weight; however, a preferred composition comprises about 15 to about 75 percent by weight of alkaline earth tungstate. When the alkaline earth tungstate is present as at least about 25 percent by weight of the article, a glass-ceramic substantially stronger than glass is formed.

The ratio of crystal to glass in the glass-ceramic articles of this invention can be determined by X-ray diffraction. For example, the quantity of $CaWO_4$ in one of the articles of this invention may be determined in the following manner:

1. An assumption is made that all the crystals present are $CaWO_4$.
2. An X-ray pattern is obtained for the glass-ceramic.
3. Powdered $CaWO_4$ and powdered glass are intimately admixed according to a predetermined weight ratio and an X-ray pattern is obtained.
4. The intensity of $CaWO_4$ peaks for the X-ray pattern of the glass-ceramic is compared with the intensity of $CaWO_4$ peaks for the admixed powders.

By utilizing the above technique, a very close approximation of crystal content in a glass-ceramic is possible. The method is particularly accurate for the alkaline earth tungstate glass-ceramics of the instant invention because of the substantial absence of unknown crystal phases. This justifies the assumption of the above-described method.

The maximum crystal content of these novel glass-ceramics can be very high, e.g., upwards of 90 percent by weight. In Table I, below, composition No. 3 illustrates a glass-ceramic having a theoretical maximum crystallinity of about 63 percent by weight. Actual crystal content may be somewhat less than theoretical inasmuch as not all the $CaO \cdot WO_3$ will precipitate from the glass as $CaWO_4$, using $CaWO_4$ as typical of the alkaline earth tungstates. A substantial quantity, for example, 90 percent of the alkaline earth tungstate present in these glass-ceramics, will precipitate as a crystal.

The phototropic articles of this invention darken rapidly when exposed to ultraviolet light, especially light of a wavelength less than about 3,000 Angstroms. The dark color fades in the absence of ultraviolet light. The fading is promoted by heating of the article or by exposure to intense physical light.

The induced color of the glass-ceramic articles of this invention vary somewhat depending upon the type of alkaline earth tungstate utilized. Calcium tungstate ($CaWO_4$) doped with bismuth provides a reddish-purple color upon exposure to ultraviolet light while bismuth-doped strontium tungstate glass-ceramics turn a yellowish-green color. Combinations of various alkaline earth tungstates in the glass-ceramic articles of this invention provide a variety of colors upon exposure of the glass-ceramic article to ultraviolet light.

The novel phototropic materials of this invention have been described herein as containing crystals which are chemical combinations of bismuth and an alkaline earth tungstate because X-ray patterns and chemical properties of these crystals indicate that they are not mere admixtures.

A fired product of calcium tungstate containing one mole percent of bismuth was examined by X-ray and compared with a physical mixture of calcium tungstate and bismuth oxide present in sufficient quantity to provide 1 mole percent of bismuth. In the physical mixture, the peaks of $Bi_2O_3$, although small, were readily apparent upon examination by X-ray diffraction. However, no peak for $Bi_2O_3$ was detected upon examination of the fired product by X-ray diffraction. The X-ray pattern of the fired product containing bismuth was substantially identical to that of $CaWO_4$ without dopant.

The nature of bismuth-doped alkaline earth tungstates was further explored by chemical means. A quantity of powdered calcium tungstate doped with 0.1 mole percent of bismuth was placed in 10 percent hydrochloric acid and stirred for one-half hour. The calcium tungstate powder was regained by filtration; it was then placed in 20 percent potassium hydroxide and stirred for one-half hour.

The calcium tungstate was regained by filtration; it was then washed and dried. After subjection to this chemical treatment, the calcium tungstate powder showed the same darkening characteristics upon exposure to ultraviolet light as bismuth containing calcium tungstate powder which had not been subjected to bleaching.

From these results it was concluded that bismuth was present not as a separate phase but was incorporated in the structure of the alkaline earth tungstate, which in this case was calcium tungstate. If bismuth had been present as a separate phase, it would have been present as an oxide, e.g., $Bi_2O_3$ or $Bi_2O_5$, since the samples were prepared by firing in air. It is known that $Bi_2O_3$ is dissolved in dilute hydrochloric acid and that $Bi_2O_5$ is dissolved by dilute KOH. Since bismuth-doped calcium tungstate was still phototropic after lengthy exposure to dilute HCL and dilute KOH, the bismuth content of the tungstate was apparently unaffected.

The glassy matrix portion of the phototropic glass-ceramic articles of this invention may comprise any of the usual glass-forming oxides. It has been found that silica and boric oxide are particularly effective for the purposes of this invention inasmuch as a viscous melt promotes slow crystallization of the melt during cooling or a subsequent heat treatment. Rapid crystallization occurring in less viscous melts results in large crystals and the product has poor mechanical strength. Phosphoric oxide as a glass former for purposes of this invention has been found to be generally ineffective because the phosphate glasses are not sufficiently viscous. Thus, the preference of boric oxide and silica does not relate to a phototropic property or behavior of the resulting article but relates to the crystallization characteristics of the article.

Aluminum oxide may be utilized as a glass-forming material but, in the absence of boric oxide or silica, the melting point of aluminum oxide glasses is too high for practical use. Thus, the glass-ceramic articles of this invention comprise a glass-former such as silica or boric oxide and an alkaline earth tungstate doped with bismuth. However, a flux in addition to the alkaline earth tungstate may be utilized, for example, alkali metal compounds which form oxides upon firing, e.g., soda, potash, and lithia, may be included in the glass-ceramic compositions of this invention.

Aluminum oxide may be utilized in conjunction with silica or boric oxide as a glass former even though alumina is not preferred as a sole glass-forming oxide. Also, additional materials conventionally utilized in glass compositions may be utilized in raw materials used to form glass-ceramic articles of this invention. Chemical compounds added for the purpose of controlling viscosity, e.g., $P_2O_5$, or promoting fining, e.g., arsenic oxide or antimony oxide, or contributing color, e.g., cobalt oxide, iron oxide, and the like, may, of course, be utilized. Such compounds will generally be present in small amounts, for example, about 2 percent or less of the glass matrix.

The glassy portion of the glass-ceramic articles of this invention may typically contain

| | |
|---|---|
| $SiO_2$ | 0–95 percent by weight |
| $B_2O_3$ | 0–95 percent by weight | wherein $B_2O_3 + SiO_2$ is about 50–95 percent by weight of the glassy matrix;

| | |
|---|---|
| $Al_2O_3$ | 0–20 percent by weight |
| $WO_3$ | 0–20 percent by weight |
| flux | 5–20 percent by weight | wherein the flux is selected from the group consisting of alkali metal oxides such as soda, potassia, lithia, and the like, and alkaline earth oxides such as calcium oxide, barium oxide, strontium oxide and the like.

The glass-ceramic articles of this invention may be formed according to conventional glass-making techniques. Batch materials are heated to an elevated temperature high enough for melting and held at such temperature for an appropriate period of time to insure the formation of a homogeneous melt, and then cooled to form a glass or glass-ceramic article. Many of the compositions of this invention have been found to form glass-ceramic articles upon cooling of the melt. Thus, spontaneous crystallization occurs upon cooling, thereby rendering unnecessary a separate heat-treating step. Other novel glass-ceramic compositions require a separate postheating step to induce the necessary crystallization.

The following table describes batch compositions which were melted and indicates the crystallization techniques necessary to provide a glass-ceramic of this invention:

TABLE I.—COMPOSITIONS OF PHOTOTROPIC GLASS-CERAMICS

| | (1) | (2) | (3) | (4) |
|---|---|---|---|---|
| Batch composition (weight ratio): | | | | |
| Silica sand ($SiO_2$) | 42.9 | 43.4 | | |
| Boric acid ($H_3BO_3$) | | | 42.2 | 50.2 |
| Alumina ($Al_2O_3$) | 6.2 | 6.3 | 9.0 | 14.1 |
| Sodium carbonate ($Na_2CO_3$) | | 5.8 | | |
| Calcium carbonate ($CaCO_3$) | 30.4 | 22.1 | 22.0 | 18.6 |
| Tungsten trioxide ($WO_3$) | 28.1 | 28.5 | 50.8 | 42.9 |
| Bismuth trioxide ($Bi_2O_3$) | 5.8 | 5.9 | 4.1 | 4.3 |
| Oxide composition calculated from batch material (weight percent): | | | | |
| $SiO_2$ | 42.9 | 43.4 | | |
| $B_2O_3$ | | | 23.8 | 28.3 |
| $Al_2O_3$ | 6.2 | 6.3 | 9.0 | 14.1 |
| $Na_2O$ | | 3.4 | | |
| $CaO$ | 17.0 | 12.5 | 12.3 | 10.4 |

Table I—Continued

| | | | | |
|---|---|---|---|---|
| $WO_3$ | 28.1 | 28.5 | 50.8 | 42.9 |
| $Bi_2O_3$ | 5.8 | 5.9 | 4.1 | 4.3 |
| Crystallization | Spontaneous (during cooling of melts) | | | (¹) |
| Phototropic crystalline phase | $CaWO_4$ | $CaWO_4$ | $CaWO_4$ | $CaWO_4$ |
| Heating temperature for melting batch materials (batch mixture) °C | 1,550 | 1,550 | 1,440 | 1,440 |

¹ Heating of glass at 650° C. or higher temperature.

REPRESENTATIVE EXPERIMENTS

EXAMPLE I A Borate Glass-Ceramic

Preparation

A batch consisting of boric acid 50.2 parts by weight, alumina 14.1 parts by weight, $CaCO_3$ 18.6 parts by weight, $WO_3$ 42.9 parts by weight, and $Bi_2O_3$ 4.3 parts by weight was prepared, which should give glass of the composition $B_2O_3$ 28.3 percent by weight, $Al_2O_3$ 14.1 percent by weight, $CaO$ 10.4 percent by weight, $WO_3$ 42.9 percent by weight and $Bi_2O_3$ 4.3 percent by weight if the composition is calculated from batch materials.

The batch for producing about 100 grams of glass was melted in a platinum crucible in gas furnace at 1400° C. for 2 hours. The melt was poured out on a copper mold to form glass plate. A brown glass was thus obtained.

Glass samples were heated at various temperatures to find the temperature where they can be converted to glass-ceramic material. The glass was found to start to crystallize at about 650° C. The crystalline material (glass-ceramics) obtained by heating the glass plate at 650° C. for several hours was quite white in appearance and mechanically strong.

X-ray Identification of Precipitated Crystalline Phase

X-ray diffraction analysis was done on the crystallized glass (glass-ceramics) obtained by heating the glass at 650° C. for 2 hours. A diffraction pattern was taken by a Norelco diffractometer with $CuK\alpha$ radiation. FIG. 1 shows the diffraction pattern. All major peaks agree quite well with the peaks of Scheelite ($CaWO_4$) given by ASTM X-ray diffraction card (ASTM Card No. 7–210). Besides the big peaks of $CaWO_4$, there are very small peaks which are unidentified. From X-ray diffraction analysis it can be said that the glass-ceramic consists of $CaWO_4$ crystallites and matrix glass which contains a small amount of unidentified crystals.

Darkening and Bleaching

Figure 2:
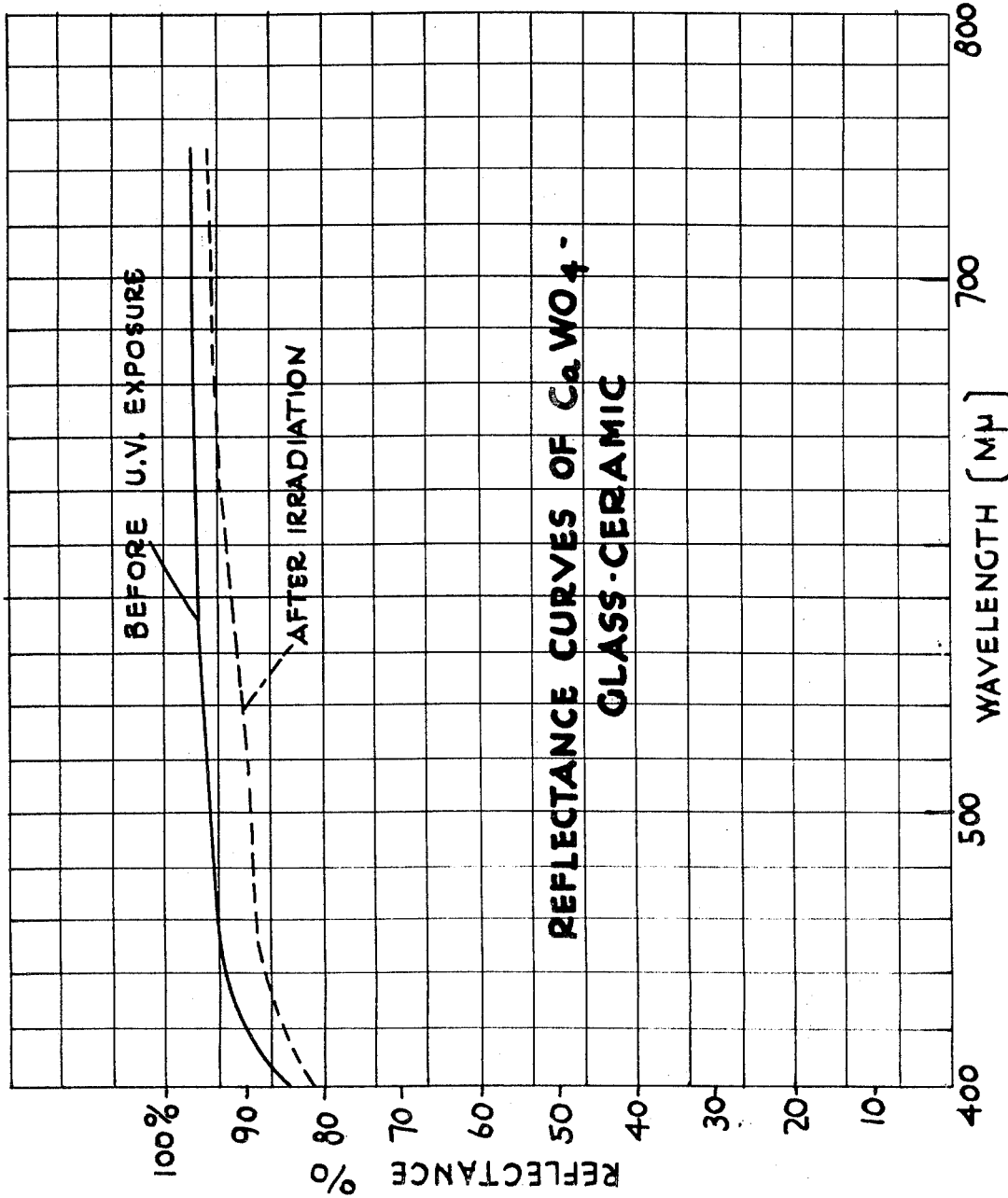

The above glass-ceramic material darkens when it is exposed to U.V. light. U.V. light from germicidal lamp (peak wavelength of emission: 2537° A.) is more effective in causing darkening than U.V. light from black-ray lamp (peak wavelength: 3660° A.). FIG. 2 shows reflectance curves of the glass-ceramic before and after it is exposed to U.V. light from germicidal lamp of General Electric Model G4T4 (4 watts) for 10 minutes at a distance of 2 inches from the U.V. source.

The darkened glass-ceramic loses its color when it is heated at the temperature of 100–125° C. or higher or it is exposed to visible light at room temperature. At 125° C., 10 minutes' heating is enough for complete bleaching. At 100° C. it takes about 30 minutes. Darkening and bleaching can be repeated.

EXAMPLE II–A Silicate Glass-Ceramic (No. 1 in Table I)

Preparation

A batch consisting of 42.9 parts by weight silica sand, 6.2 parts by weight alumina, 30.4 parts by weight $CaCO_3$, 28.1 parts by weight $WO_3$, and 5.8 parts by weight $Bi_2O_3$ was prepared, which should give a glass-ceramic of the oxide composition 42.9 percent by weight $SiO_2$, 6.2 percent by weight $Al_2O_3$, 17.0 percent by weight CaO, 28.1 percent by weight $WO_3$, and 5.8 percent by weight $Bi_2O_3$ if the composition is calculated from batch materials.

The batch for producing about 100 grams of glass was melted in a platinum crucible in gas furnace at 1550° C. for 2 hours. It became a very viscous melt. The melt was poured out on a copper mold to form plate samples. During cooling crystallization occurred spontaneously and a fine-grained glass-ceramic was obtained as a result.

X-ray Identification

Figure 3:
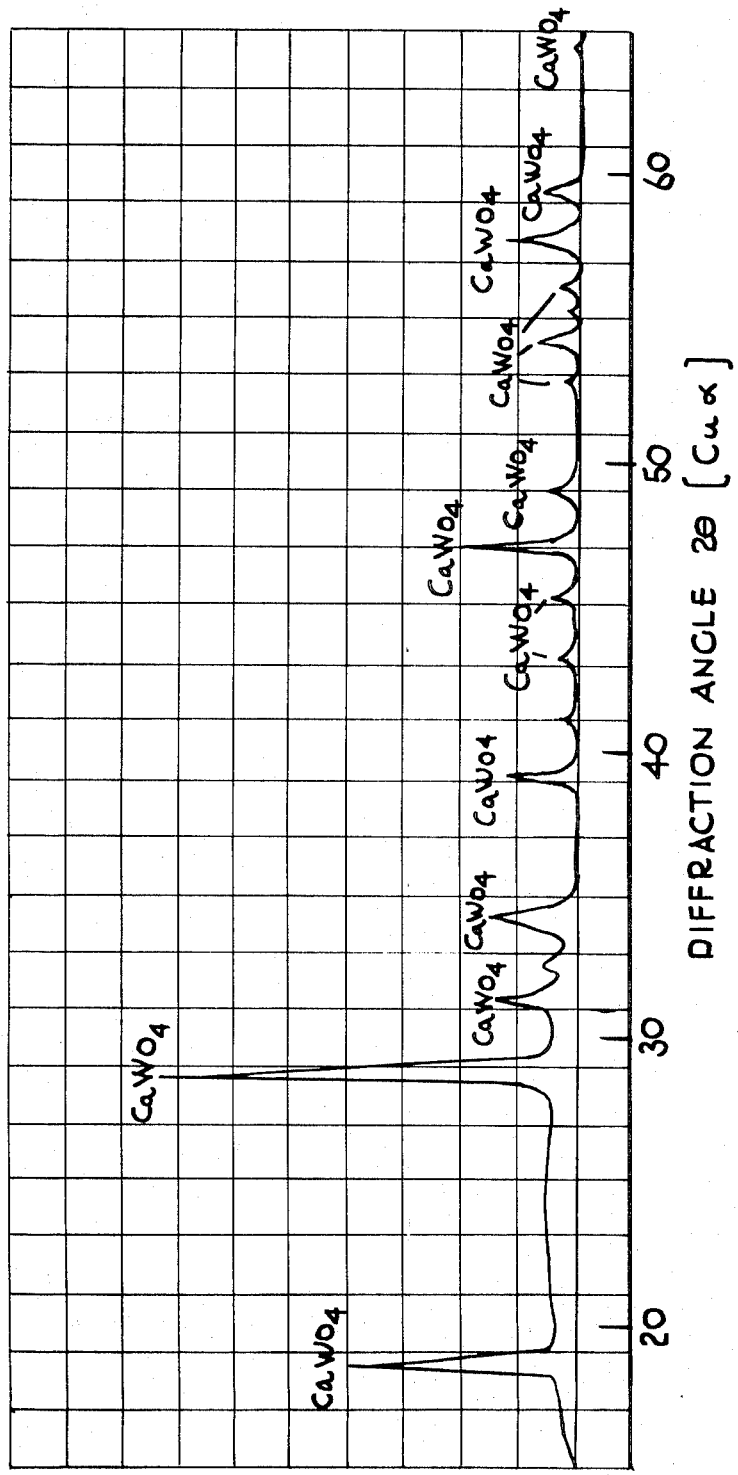

X-ray powder pattern (FIG. 3) of the glass-ceramic showed that major crystalline phase precipitated is $CaWO_4$.

Darkening and Bleaching

The darkening and bleaching of the glass-ceramic is similar to that of the glass-ceramic described in the above example (Example I).

The glass-ceramic articles of this invention have numerous uses. Those which contain bismuth doped alkaline earth tungstate crystals are phototropic. In clear form such articles are useful as phototropic windows while in translucent or opaque form such articles may be useful as display panels for inscribing with U.V. light and capable of being erased with heat or visible light or as computer memory units. Those articles which comprise at least 30 percent by weight of alkaline earth crystals are further useful as cookware and similar uses typical of presently commercial glass-ceramic articles. This latter utility, of course, is independent of the phototropic character of such products and exists for articles containing no bismuth.

Although the above examples have set forth specific embodiments of the instant invention, it is not limited solely thereto but includes all those variations and modifications set forth in the appended claims.

I claim:

1. A phototropic glass-ceramic article comprising a glassy matrix containing, as a phototropic agent, crystals of calcium tungstate, which crystals are doped with bismuth, said calcium tungstate comprising about 10 to 90 percent by weight of the article.

2. The article of claim 1 wherein the glassy matrix contains a glass former selected from the class consisting of boric oxide and silica.

3. The article of claim 1 wherein the glassy matrix is less than about 90 percent by weight of the article, said glassy matrix consisting essentially of:

| | |
|---|---|
| $SiO_2$ | 0–95 percent by weight |
| $B_2O_3$ | 0–95 percent by weight | wherein $B_2O_3+SiO_2$ is about 50–95 percent by weight;

| | |
|---|---|
| $Al_2O_3$ | 0–20 percent by weight |
| $WO_3$ | 0–20 percent by weight |
| flux | 5–20 percent by weight | wherein the flux is selected from the group consisting of alkali metal oxides and calcium oxide and the crystals of calcium tungstate comprise at least about 10 percent by weight of said article.

4. The article of claim 1 wherein the crystals are present as at least 50 percent by weight of the article.

5. The article of claim 1, wherein bismuth is present as about 0.01 to about 5 mole percent of the calcium tungstate.